June 18, 1963 R. W. WILSON 3,094,082
PLANT TRAY AND SETTING MEANS FOR PLANT SETTING MACHINES
Filed Feb. 27, 1961 2 Sheets-Sheet 1
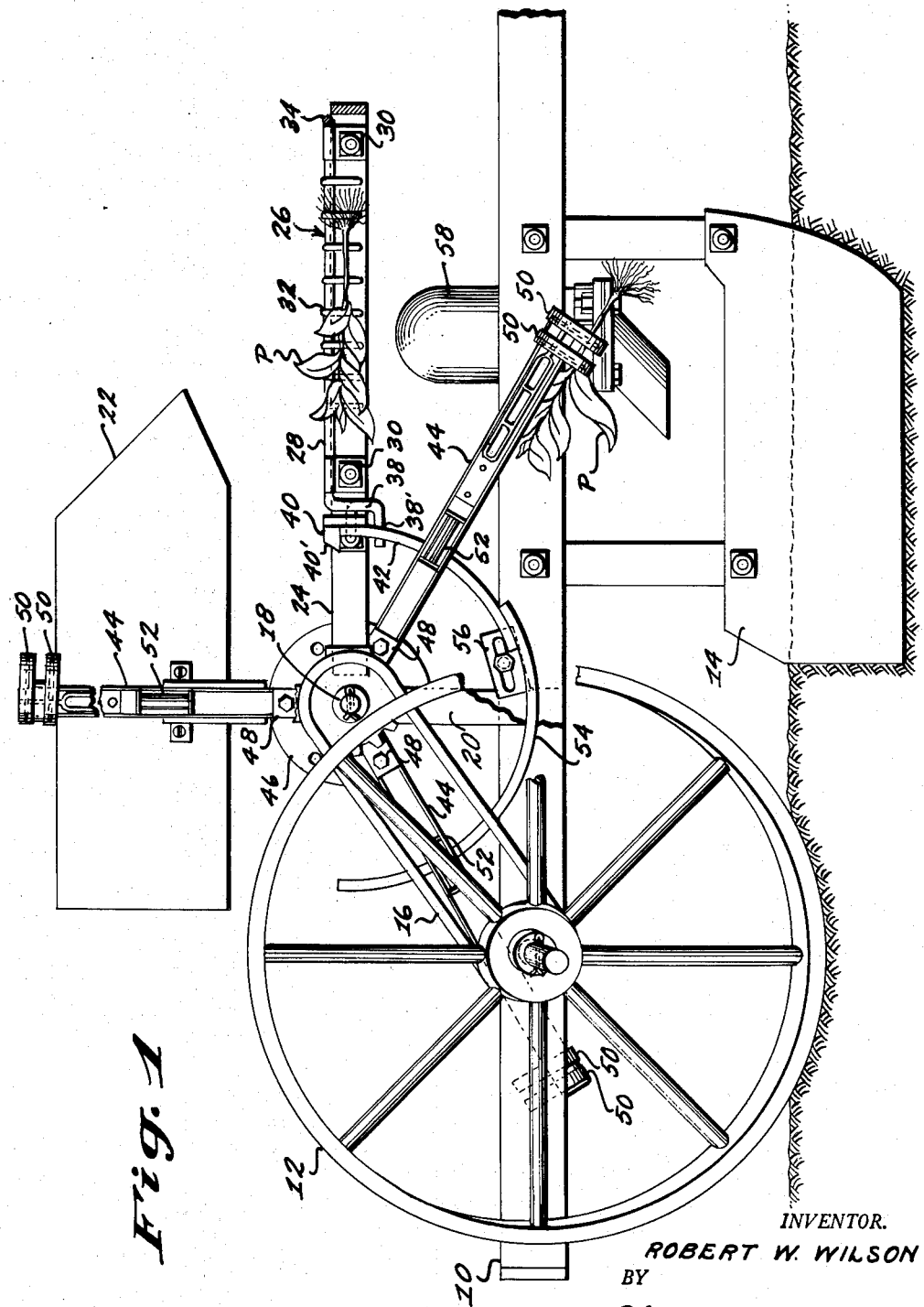
*INVENTOR.*
ROBERT W. WILSON
BY
Channing L. Richards
*ATTORNEY*

June 18, 1963   R. W. WILSON   3,094,082
PLANT TRAY AND SETTING MEANS FOR PLANT SETTING MACHINES
Filed Feb. 27, 1961   2 Sheets-Sheet 2
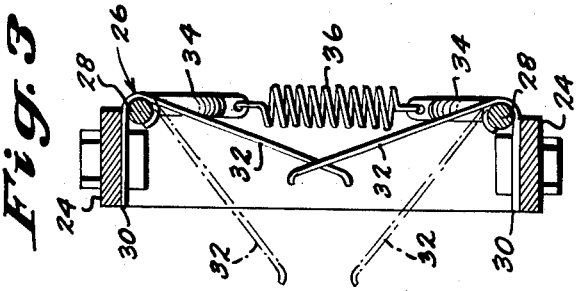
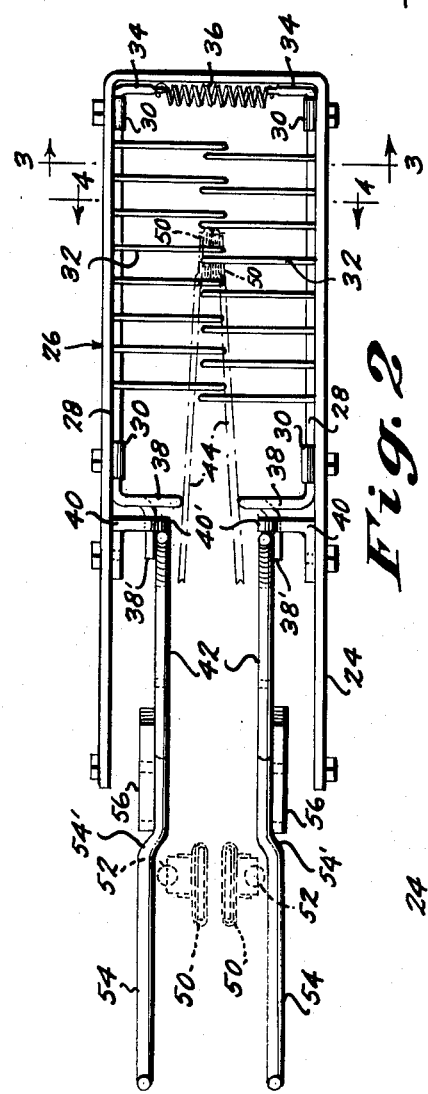
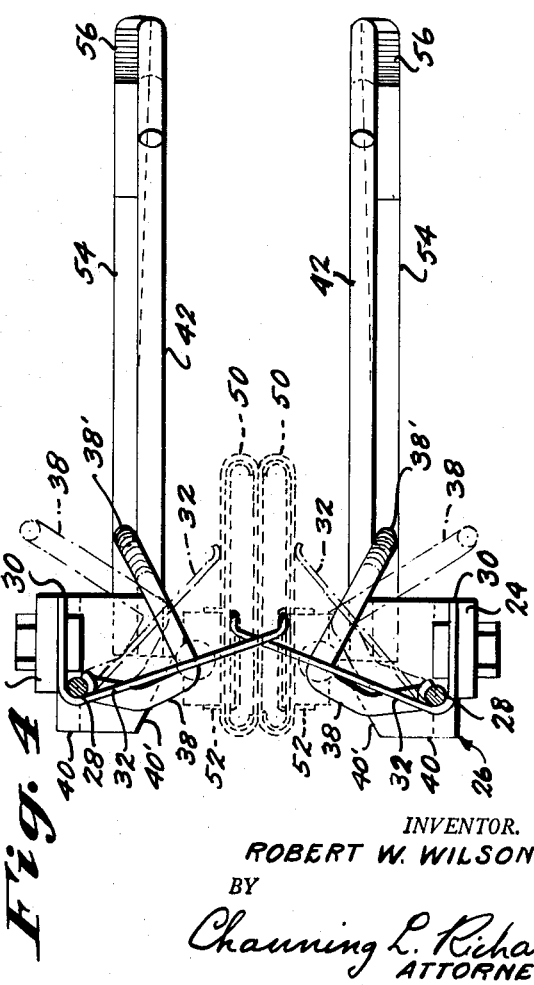
INVENTOR.
ROBERT W. WILSON
BY
Channing L. Richards
ATTORNEY

United States Patent Office 3,094,082
Patented June 18, 1963

3,094,082
PLANT TRAY AND SETTING MEANS FOR PLANT SETTING MACHINES
Robert W. Wilson, Charlotte, N.C., assignor to R. H. Bouligny, Inc., a corporation of North Carolina
Filed Feb. 27, 1961, Ser. No. 91,745
1 Claim. (Cl. 111—2)

This invention relates generally to transplanting or plant setting machines, and more particularly to an improved plant tray and related setting means structure for supporting a plant in position to be grasped for transplanting or setting by the setting means of a machine of this sort.

The improved plant tray and related setting means structure of the present invention incorporates an arrangement for supporting a plant to be set so that it may be removed downwardly from the support for setting through a setting transfer distance that can be made quite short with a resulting substantial advantage both in structural simplification and effective plant handling and setting action. In the latter connection, the present invention is further particularly characterized by a plant tray providing support at spaced points throughout the length of a plant to be set, and by a related setting means acting to grasp the supported plant at spaced points, so that the plant handling during setting can be accomplished to equally good advantage with all sorts of plants, including those having relatively large root or top portions that are often quite difficult to set by machine without damaging the plant.

These and other features of the present invention are described in detail below in connection with the accompanying drawings, in which:

FIG. 1 is a side elevation, partly cut away and partly in section, of a plant setting machine incorporating a plant tray and related setting means structure arranged in accordance with the present invention;

FIG. 2 is a plan view of the plant tray structure and the cam provided for operating the planting arm as shown in FIG. 1, with the position of vertically disposed pair of planting arms indicated by dotted lines in relation to the cam means, and a more or less horizontally disposed pair of planting arm indicated by broken lines in relation to the plant tray structure;

FIG. 3 is a sectional detail taken substantially on the line 3—3 in FIG. 2; and

FIG. 4 is a further sectional detail taken substantially on the line 4—4 in FIG. 2.

Referring now in detail to the drawings, and more particularly at first to FIG. 1, the illustrated plant setting machine incorporating the present invention comprises a main frame 10 carried on ground wheels 12 which may be canted and formed with concave rims, as shown, to act as covering means for closing a furrow prepared by an opening sword 14 carried forwardly on the frame 10. Any suitable form of hitch (not shown) may be arranged at the forward end of the main frame 10 (i.e., the end to the right in FIG. 1), the illustrated plant setting machine being arranged particularly for use as a lift attachment with a tractor, so that the hitch in this case would comprise an arrangement for attachment to the rear end lift mechanism of a tractor.

From the ground wheels 12 drive connections 16 run to an operating shaft 18 journalled on bracket arms 20 that are extended uprightly from the frame 10 to dispose the operating shaft 18 for carrying the setting means of the illustrated machine as described in further detail below. The upright bracket arms 20 are also arranged to support plant supply hoppers 22 at each side of the machine, and to carry a forwardly extending sub-frame 24 on which the improved plant tray structure of the present invention in mounted as indicated generally by the reference numeral 26.

This plant tray structure 26 comprises a pair of pivot members 28 (compare FIGS. 1 and 2) mounted on the sub-frame 24 in parallel spaced relation by brackets 30 so as to be rotatable about axes spaced laterally at each side and in substantially parallel relation with respect to the stalk of a plant P supported on the tray structure 26. The portion of the tray structure 26 on which a plant P is directly supported is formed by a plurality of spaced rod elements 32 that are carried on the pivot members 28 to extend laterally therefrom with overlapping reaches. The forward ends of the pivot members 28 are formed inwardly, as shown at 34 in FIGS. 2 and 3, and a tension spring 36 is extended between these ends 34 so as to bias the pivot members 28 to a normal position at which the rod elements 32 extend therefrom with a downward inclination in cradle-like form for carrying and positioning a plant P centrally between the pivot members 28.

As thus arranged on the pivot members 28, the rod members 32 provide spaced supports for the entire length of a plant P placed thereon while affording grasping access thereto at a plurality of points, as is noted in greater detail further below. The pivot members 28 are further formed at their rear ends with abutment arm portions 38 that extend inwardly, and then downwardly, and then rearwardly again as at 38', in relation to adjacent bracket members 40 (compare FIGS. 2 and 4) that are fixed on the sub-frame 24 for positioning the upper ends of cam bars 42 to actuate the previously mentioned setting means in relation to the plant tray structure 26.

The setting means provided for operation in relation to the plant tray structure 26 of the present invention comprises pairs of planting arms 44 arranged symmetrically on mounting plates 46 in radial relation about the operating shaft 18. The planting arms 44 are attached to the mounting plates 46 by leaf springs 48 which bias the extending ends of the planting arms 44 outwardly, and the extending ends of the planting arms 44 are fitted with plant grasping means comprising a plurality of spaced fingers 50 carried to reach transversely from the arms 44 in the direction of travel for grasping a plant P at a plurality of points lengthwise thereof between, and straddling at least one of the spaced supports formed by the plant tray rod members 32. Each of the planting arms 44 is further arranged intermediate its length to carry a following roll 52 through which its plant grasping and releasing action is actuated.

In operation, with the plant setting machine illustrated in FIG. 1 being drawn through a field to the right as seen in FIG. 1, operators, who may be provided with riding seats (not shown) at each side of the forward end of the main frame 10, select plants P from the supply hoppers 22 and respectively place them in the position illustrated on the plant tray structure 26 in advance of the approach of each pair of planting arms 44 thereto. A plant P in place on the plant tray structure 26 is positioned in the operating path of the planting arms 44, and the advancing pair of planting arms 44 will be biased outwardly to open position by the leaf springs 48 as they approach the plant tray structure 26. Upon such approach, the plant grasping fingers 50 at the extending ends of the planting arms 44 are disposed to travel between the spaced plant supporting rod elements 32, and thereby move into the position for grasping a supported plant P, while the followers rolls 52 carried on the planting arms 44 intermediate their length advance to operating contact with the bracket members 40 carrying the cam bars 42, and with the abutment arm portions 38 at the rear ends of the plant tray pivot members 28.

The bracket members 40 have the upper portions of their inner edges inclined outwardly, as indicated at 40' in FIG. 4, and the planting arm follower rolls 52 reach these inclined edge portions 40' first and are directed thereby inwardly to a riding disposition at the upper entrance ends of the cam bars 42, so as to move the planting arms 44 and the grasping fingers 50 thereon inwardly to grasp a plant P supported in the path thereof on the tray structure 26. At the same time, in traveling down the inclined edge portions 40' of the bracket members 40, the planting arm follower rolls 52 strike the abutment arm portions 38 of the plant tray pivot members 28 and cause these arm portions 38 to pivot downwardly. This downward pivoting of the abutment arm portions 38 in turn rocks the plant tray pivot members 28 so as to cause a corresponding downward displacement of the spaced rod elements 32 carried thereon. This downward displacement, as illustrated by dotted lines in FIGS. 3 and 4, results in opening a space between the extending reaches of the rod eleemnts 32 through which the plant P grasped by the planting arms 44 may be carried downwardly with the follower rolls 52 riding the cam bars 42 to maintain the planting arm grasping means 50 closed on the plant P.

After such downward removal of the grasped plant P, the follower rolls 52 will have passed below the abutment arm portions 38 so as to release them for recovery movement with the pivot members 28 under the force of tension spring 36 to their normal disposition at which the plant tray rod elements 32 again extend in overlapping relation to receive a succeeding plant P thereon in position to be grasped for setting by a succeeding pair of planting arms 44. In this connection, it should also be noted that the rearwardly extending lengths 38' of the pivot member abutment arm portions 38 reach behind cam bars 42 (see FIGS. 4 and 5) so as to serve as stop elements limiting the recovery travel of the pivot members 28 to this normal biased position.

The cam bars 42 that maintain the planting arms 44 in grasping relation with a plant P removed from the plant tray structure 26 extend downwardly to a disposition at their lower ends aligned above a second pair of cam bars 54 that are arranged on bracket plates 56 adjustably secured to the main frame 10. This second pair of cam bars 54 are outwardly stepped intermediate their length, as illustrated at 54' in FIG. 2 so as to allow outward movement of the planting arm follower rolls 52 and thereby provide for opening the plant grasping fingers 50 at the extending ends of the planting arms 44 to release a plant P therefrom at a proper setting position in the furrow prepared by the opening sword 14, as previously mentioned, and in which water may be deposited periodically for each newly set plant through actuation of a water valve at 58 by the setting means as the planting arms 44 travel downwardly to the setting position.

The result of this arrangement is a consistently effective operation for setting plants P of all sorts in the above described manner; the spaced plant tray rod members 32 forming an effective full length support for any particular type of plant P that is to be handled, while at the same time affording clear grasping access for the spaced fingers 50 of the related setting means by which the grasping of the plant P is effected at a plurality of points along its length, so as also to provide for holding the plant P with adequate lengthwise support during its transfer for setting.

The present invention has been described in detail above for purposes of illustration only and is not intended to be limited by this description or otherwise except as defined in the appended claim.

I claim:

In a plant setting machine of the type incorporating setting means comprising at least one setting arm structure extending from a support on said machine for cyclic operating travel and carrying plant grasping means at the extending end thereof, cam means disposed on said machine for cyclically operating said setting arm structure to grasp a plant at a pickup station on said machine and transfer said plant downwardly from said pickup station for release at a setting position, and means carried by said machine for supporting a plant at said pickup station for grasping by said grasping means on said setting arm structure; said plant supporting means comprising a plant carrying and positioning structure forming a plurality of spaced supports for the entire length of a plant to be set, said plant carrying and positioning structure being pivotally mounted on said machine and extending laterally at said pickup station across the cyclic operating path of said setting arm structure and having the pivot mounting thereof yieldably biased to maintain said setting arm structure normally at said extending position while allowing displacement of said structure from said path about said pivotal mounting in substantially parallel and laterally spaced relation with respect to the stalk of a plant positioned thereon, abutment means connected to said plant carrying and positioning structure and extending laterally inward from said pivotal mounting in the cyclic operating path of said setting arm structure intermediate the extending length thereof and spaced from said plant carrying and positioning structure for effecting displacement thereof from said operating path through contact by said setting arm structure intermediate the extending length thereof with said abutment means as a plant supported at said pickup station is grasped by said grasping means at the extending end of said setting arm structure through the action of said cam means, and said grasping means at the extending end of said setting arm structure comprising a plurality of spaced fingers carried to reach transversely therefrom in the direction of travel for grasping a plant at a plurality of points lengthwise thereof between and straddling at least one of the spaced supports formed by said plant carrying and positioning structure.

References Cited in the file of this patent

UNITED STATES PATENTS

| | | |
|---|---|---|
| 398,754 | Stratton | Feb. 26, 1889 |
| 570,905 | Cheeseman | Nov. 10, 1896 |
| 1,026,492 | Bruhn | May 14, 1912 |
| 1,638,368 | Shaw | Aug. 9, 1927 |
| 1,848,865 | Baele | Mar. 8, 1932 |
| 2,333,945 | Mast | Nov. 9, 1943 |
| 2,739,548 | Poll | Mar. 27, 1956 |
| 2,804,033 | Burroughs | Aug. 27, 1957 |
| 2,959,141 | Wilson | Nov. 8, 1960 |